(12) United States Patent
Lesley

(10) Patent No.: US 6,333,976 B2
(45) Date of Patent: *Dec. 25, 2001

(54) METHOD AND APPARATUS FOR PROVIDING PREPAID TELECOMMUNICATIONS SERVICES

(75) Inventor: Ulf Lesley, Danderyd (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 09/732,881

(22) Filed: Dec. 11, 2000

Related U.S. Application Data

(63) Continuation of application No. 08/747,424, filed on Nov. 12, 1996, now Pat. No. 6,188,752.

(51) Int. Cl.[7] .................................................. H04M 15/00
(52) U.S. Cl. ................................. 379/114.01; 379/114.2; 379/114.16; 379/114.17
(58) Field of Search .......................... 379/112.01, 114.01, 379/114.15, 114.17, 114.16, 144.01, 126, 127.01, 127.06, 130, 133–134; 455/406, 405

(56) References Cited

U.S. PATENT DOCUMENTS 4,776,000  10/1988  Parienti et al. .
5,138,650  8/1992  Stahl et al. .

(List continued on next page.)

FOREIGN PATENT DOCUMENTS 43 12 362 A   10/1994   (DE) .
0 587 259      3/1994   (EP) .

(List continued on next page.)

Primary Examiner—Duc Nguyen
(74) Attorney, Agent, or Firm—Nixon & Vanderhye P.C.

(57) ABSTRACT

Instead of requiring a customer to carry around one or more prepaid telephone calling cards (such cards are effectively functioning as limited, fixed amounts of money), a communications network-based solution is provided that facilitates both prepayment and use of prepay telecommunications services. A subscriber is assigned a record in a network database. The database record includes an account number and an associated prepaid monetary value. Then when the subscriber calls from a prepaid telecommunications terminal (e.g., a public telephone), requesting a telecommunications service (e.g., a long distance telephone call), the communications network processes the request by analyzing the subscriber database record. If the prepaid monetary value in the subscriber's record is sufficient for the requested service, the service is authorized. The prepaid monetary value in the subscriber's record is decreased in accordance with the service rendered. Accordingly, a subscriber does not need to purchase any prepaid calling card, remember to carry the prepaid calling card, or remember the amount stored on the calling card. Rather, prepaid calling services are obtained simply by subscribing to the network prepayment service. The subscriber also easily adds monetary value to the subscriber's prepaid account by accessing the prepaid network service, (e.g., by dialing the appropriate network service number), indicating the desire to add monetary value to the subscriber's prepaid account in the database. The subscriber is prompted to enter a desired amount of money which is then added to the prepaid monetary value field in the subscriber's database record. There is no need to travel to a card distribution center or the like to obtain a new or recharged prepaid calling card.

44 Claims, 5 Drawing Sheets

U.S. PATENT DOCUMENTS

| | | |
|---|---|---|
| 5,148,472 | 9/1992 | Freese et al. . |
| 5,205,899 | 4/1993 | Gupta et al. . |
| 5,251,248 | 10/1993 | Tokunaga et al. . |
| 5,264,689 | 11/1993 | Maes et al. . |
| 5,359,182 | 10/1994 | Schilling . |
| 5,359,642 | 10/1994 | Castro . |
| 5,408,519 | 4/1995 | Pierce et al. . |
| 5,440,621 | 8/1995 | Castro . |
| 5,481,600 | 1/1996 | Alesio . |
| 5,483,582 | 1/1996 | Pugh et al. . |
| 5,487,107 | 1/1996 | Atkins et al. . |
| 5,495,098 | 2/1996 | Pailles et al. . |
| 5,502,759 | 3/1996 | Cheng et al. . |
| 5,511,114 | 4/1996 | Stimson et al. . |
| 5,546,446 | 8/1996 | Tsunokawa et al. . |
| 5,563,934 | 10/1996 | Eda . |
| 5,577,100 | 11/1996 | McGregor et al. . |
| 5,577,109 | 11/1996 | Stimson et al. . |
| 5,583,918 | 12/1996 | Nakagawa . |
| 5,621,787 | 4/1997 | McKoy et al. . |
| 5,631,947 | 5/1997 | Wittstein et al. . |
| 5,675,607 | 10/1997 | Alesio et al. . |
| 5,677,945 | 10/1997 | Mullins et al. . |
| 5,719,926 | 2/1998 | Hill . |
| 5,721,768 | 2/1998 | Stimson et al. . |
| 5,825,863 | 10/1998 | Walker . |
| 5,912,956 | 6/1999 | Longo et al. . |
| 6,188,752 * | 2/2001 | Lesley . |

FOREIGN PATENT DOCUMENTS

| | | |
|---|---|---|
| 0 645 773 A1 | 3/1995 | (EP) . |
| 0 698 987 A | 2/1996 | (EP) . |
| 2 708 363 A1 | 2/1995 | (FR) . |
| 2 745 970 | 3/1996 | (FR) . |
| 2 171 877 A | 9/1986 | (GB) . |
| 2 215 897 A | 9/1989 | (GB) . |
| 96 15633 A | 5/1996 | (WO) . |

* cited by examiner

FIG. 2

DATABASE RECORD 50

| SUBSCRIBER ACCOUNT NUMBER | PRE-PAY ACCOUNT NUMBER | PIN (OPTIONAL) | CURRENT $ AMOUNT |
|---|---|---|---|
| 52 | 54 | 56 | 58 |

| | |
|---|---|
| ORIGINATING TELEPHONE NUMBER | 72 |
| DESTINATION TELEPHONE NUMBER | 74 |
| SUBSCRIBER/PRE-PAY ACCOUNT NUMBER(S) | 76 |
| START TIME | 78 |
| ELAPSED TIME | 80 |
| ORIGINATION LOCATION | 82 |
| DESTINATION LOCATION | 84 |
| OTHER BILLING INFORMATION | 86 |

METHOD AND APPARATUS FOR PROVIDING PREPAID TELECOMMUNICATIONS SERVICES

This is a continuation of application Ser. No. 08/747,424, filed Nov. 12, 1996 now U.S. Pat. No. 6,188,752, the entire content of which is hereby incorporated by reference in this application.

FIELD OF THE INVENTION

The present invention relates to telecommunications services, and more particularly to a method and system for providing prepaid telecommunications services.

BACKGROUND OF THE INVENTION

Prepaid telephone calling cards are known. Cards are batch activated by the card provider in a limited number of predetermined values. Such cards are purchased from vending machines, point of sale terminals, or other distribution centers, in fixed value increments, such as $10, $20, etc. A $10 card, for example, provides the cardholder with $10 worth of telephone time to make telephone calls. If during the call, the time remaining on the card is about to expire, the customer may be prompted that only a certain amount of time remains. When the designated time has expired, the call is automatically terminated. Because charges are limited to the card's face value, neither the customer nor anyone who obtains possession of the card can run up a large bill.

These types of prepaid calling cards have been successful because prepaid calling card customers avoid collect and operator assistance surcharges, and they can obtain local and long distance calling without credit and without payment of monthly bills. Further, no coins are necessary to place a call. Another bonus is that the operator does not have to collect coins from public telephones which also reduces vandalism and theft. However, these prepaid cards have significant drawbacks. Such calling cards are inconvenient because the customer must physically carry the card on his/her person. If the card is forgotten, the customer is further inconvenienced when a call needs to be made. In addition, the prepaid calling cards issued with fixed/preset amounts do not necessarily correspond with the amount of telephone time a user needs or ends up using. If the allotted amount is too little, the customer's call is prematurely terminated. The only solution is for the customer the further inconvenience of carrying multiple cards that also may be stolen or lost. Moreover, if a caller uses less than the alotted amount on the card, the remaining amount may be essentially useless if (1) it is less than the basic amount required to make a particular call or (2) it is so little that the call will be for too short a period of time. Another serious problem is that even the process of obtaining a new card is cumbersome and time consuming because the customer is required to physically travel to a sales office or other distributor where these cards are issued or recharged. Still further are the environmental drawbacks associated with disposing of all the used prepaid calling cards.

Thus there is a need for an improved approach to prepaid telecommunications systems that overcomes these and other problems.

It is an object of the present invention to provide prepaid telecommunications services where prepayment (on one or repeated occasions) is easy and quick.

It is another object of the present invention to provide prepaid telecommunications services which can be prepaid using the telecommunications network.

It is another object of the present invention to provide prepaid telecommunications services where prepayment can be made in variable user designated amounts.

It is another object of the present invention to provide prepaid telecommunications services where prepayment of telecommunications services and use of such prepaid telecommunications services does not require cards.

It is a further object of the present invention to eliminate the need for a customer to have to obtain a new or renewed card for continued use of prepay services.

To meet these and other objectives, the present invention takes a completely different approach to providing prepaid telecommunications services. Instead of requiring a customer to carry around one or more cards where the cards are effectively functioning as limited, fixed amounts of money, the present invention provides a network-based solution that facilitates both prepayment and use of telecommunications services. A subscriber is assigned a record in a database. The database record includes an account number and an associated prepaid monetary value. When the subscriber calls from a prepaid telecommunications terminal (e.g., a public telephone), requesting a telecommunications service (e.g., a long distance telephone call), the communications network processes the request by analyzing the subscriber's database record. If the prepaid monetary value in the subscriber's record is sufficient for the requested service, the service is authorized. The prepaid monetary value in the subscriber's record is decreased in accordance with the service rendered. Accordingly, a subscriber does not need to purchase any prepaid calling card, remember to carry the prepaid calling card, or remember the amount stored on the calling card. Rather, prepaid calling services are obtained simply by subscribing to the network prepayment service.

In accordance with the present invention, a subscriber may easily add monetary value to the subscriber's prepaid account. The user simply accesses the prepaid network service (e.g., by dialing the appropriate network service number), and indicates the desire to add monetary value to the subscriber's prepaid account in the database. Once the account and/or caller is/are identified and preferably authenticated, the subscriber is prompted to enter a desired amount of money to be added to the prepaid monetary value field in the subscriber's database record. The amount to be added may be fixed or variably determined by the subscriber. A fixed amount may make prepayment particularly easy since the subscriber could simply call the service and the fact of making the call would add a fixed amount to his prepaid account. The network therefore generates a new prepaid monetary value in the database associated with the prepaid account number. Immediately thereafter, the user can request and receive prepaid telecommunications services without a card and without concern whether a prepaid calling card has sufficient remaining funds to pay for the desired telecommunications service.

Another significant feature of the present invention is that the communications network takes care of generating a billing record for the subscriber which includes the amount of money added to the prepaid monetary value of the database. At the end of a billing cycle when the subscriber receives his regular telephone bill, an entry is included corresponding to the prepaid monetary value added to the subscriber's prepaid account number.

While the present invention may be implemented in a number of different ways, a preferred example embodiment employs an intelligent network. An intelligent network node connected to the communications network provides the prepayment telecommunications service. The intelligent network node includes a service control processor that stores database records assigned to network prepayment service subscribers. Each database record includes a prepaid account number and an associated prepaid monetary value for each network subscriber. A service switching processor, coupled to either directly to the subscriber or to the subscriber's local switch and then to the service control processor, detects and routes calls directed to prepayment of communications services involving network subscribers to the service control processor. The service control processor makes necessary prepayment decisions, e.g., whether the caller has a prepay account, whether the account have sufficient current funds, whether the caller is authorized to alter the account amount, etc. The service control and/or switching processors also coordinate commands to the network, e.g., authorizing a prepaid call, updating billing records, etc.

The intelligent node interfaces with the subscriber over the network using any number of techniques including speech synthesis, speech recognition, DTMF tones, etc. to permit the subscriber to add to the prepaid monetary value associated with the subscriber in the database an amount of money entered by the caller, or alteratively, add a fixed amount per each service call. The newly generated prepaid monetary value in the database associated with a subscriber's prepaid account number can be immediately used to pay for a subsequent prepayment communications service.

Accordingly, the present invention provides a number of advantages to both the telecommunications subscriber and the telecommunications operator. For the telecommunications subscriber, there is no need to buy or renew one or more prepaid calling cards once the call value of an existing card is expired. Therefore, there is no need for the subscriber to travel to a telecommunications sales outlet or other distributor of prepaid calling cards. Significantly, the need for even carrying a card is eliminated. Of course, if desired, a single card having a prepayment network service's telephone number and/or the subscriber's prepaid account number may be issued until such numbers are memorized. Also the subscriber does not need to have cash handy to buy new prepaid calling cards since the prepayment amount requested via telephone is included on the subscriber's monthly telephone bill.

For the telecommunications operator, because the present invention permits a subscriber to always have access to prepaid telecommunications services, prepaid telecommunications services are used more frequently, and therefore, more revenue is generated for the telecommunications operator. By eliminating the need for conventional prepaid calling cards, overhead associated with the manufacture, servicing and distribution of those cards is eliminated. Prepay accounting and administration are considerably reduced since the newly added prepayment value is billed automatically to the subscriber's monthly phone bill. Environmentally, there is not excess waste associated with plastic cards; nor will there be any future problems if companies are ultimately held responsible for disposing of waste associated with their discarded products. Moreover, telecommunications operators also have the option of charging for the prepayment network service itself.

These and other objects, advantages, and features of the present invention will now be described in more detail below in conjunction with the drawings.

BRIEF DESCRIPTION OF THE DRAWINGS

FIG. 2 is a simplified representation of a database record maintained for a subscriber to a prepayment network service in accordance with an example embodiment of the present invention;

FIG. 3 is a conceptual representation of a formatted record received by the billing node in FIG. 1 in accordance with an example embodiment of the present invention;

DETAILED DESCRIPTION OF THE INVENTION

In the following description, for purposes of explanation and not limitation, specific details are set forth, such as specific components, interfaces, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 1:
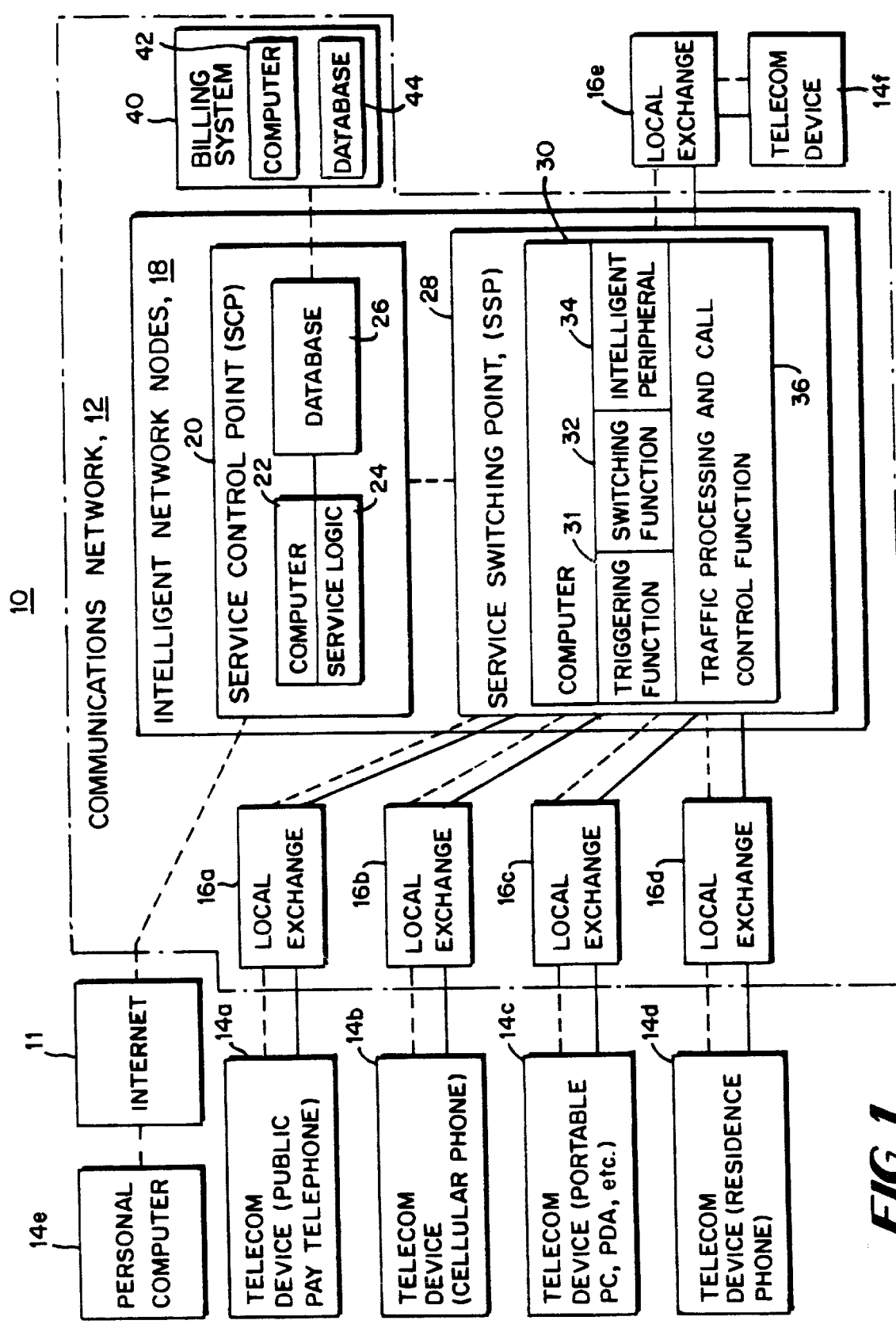
FIG. 1 is a schematic representation of a telecommunications system in which the present invention is implemented in a preferred, intelligent network example embodiment.

Referring to FIG. 1, a simplified telecommunications system 10 is shown in which a non-limiting, preferred example embodiment for implementing the present invention is described. A simplified telecommunications network 12 includes a plurality of optional local telephone exchanges 16a–16e (alternatively, subscribers can use the intelligent service switching processor as their local exchange), intelligent network nodes 18, billing system 40, and a plurality of telecommunications devices 14a–14f. Since wireline telecommunications devices including public pay telephones 14a, subscriber telephones at the subscriber's home or residence 14d, portable personal computers (laptops), personal digital assistants and the like 14c, and personal computers and facsimile machines 14e, and wireless telecommunications devices such as cellular radio telephones 14b can all be connected or otherwise coupled to the communications network 12 (either directly or indirectly, e.g., via the internet 11), the term "telecommunications device" or "communications device" includes all such devices. Likewise, the term "communications service or services" includes any communications service that is provided by the telecommunications network 12 including but not limited to communication processes (both voice and data) conducted between two or more telecommunications devices that involve a telecommunications network. While prepaid telecommunications services are most commonly viewed today in the context of public pay telephones, the present invention is applicable to any communications service for which payment must be rendered before, during, or immediately after the telecommunications service is provided. Moreover, while the present invention is sometimes described in the specification in the context of an intelligent network (IN) implementation, the present invention is in no way limited to an IN implementation or apparatus.

An "intelligent network" denotes a telecommunications network that provides services in addition to basic call routing and switching. Referring to FIG. 1, intelligent network nodes 18 interface with a traditional telecommunications network 12 that includes local and other switching exchanges, cross-connects, asynchronous transfer mode (ATM) nodes, etc. The intelligent network nodes 18 include a service switching processor 28 sometimes referred to in the industry as a service switching point (SSP). A service switching point is essentially a local exchange with additional software used to identify IN calls. The service switching point in turn is connected to a service control processor 20 sometimes referred to in the industry as a service control point (SCP).

Service switching point 28 includes a computer 30, an intelligent peripheral 34 that performs a number of advanced functions such as voice recognition, a triggering function 30, a switching function 32 (as mentioned above the SSP is essentially a local exchange with extra functionality), and a traffic processing and call control function 36. The service control point 20 includes a computer 22 and service logic 24 for implementing various advanced services provided by the intelligent network nodes 18. If desired, the two intelligent nodes 20 and 28 could be integrated into a single service switching and control point processor (SSCP). In either configuration, the service logic 24 is independent of network access and transport implementation.

The service switching point 28 provides subscribers access via communications network 12 to a prepayment network service provided by the service control point 20. While signaling information is generally indicated as being communicated to the service switching point 28 by dashed lines in FIG. 1, it is to be understood that such signaling information is communicated to the switching and call control functions (32 and 36) of the service switching point 28. The service switching point 28 forwards a prepayment service request to the service control point 20 (using an appropriate data transaction protocol) to establish interaction between the prepayment network service and a caller/telecommunications device. Thus, the service switching point 28 interfaces various calls in the network 12 by way of its digital switching function 38 and the prepayment network services available from the service control point 20.

"Triggering points" in the call switching process are detected at the service switching point 28. A basic example of triggering point is a call attempt to a specific number. As applied to the present invention, such a triggering point might be detection of detected prepayment network services telephone number, e.g., a special "800" number. When such a triggering point is detected by triggering function 31, the service switching point computer 30 immediately informs the service control point 20 about the triggering event and forwards various associated call connection data such as the telephone number of the calling terminal and the destination number. The service control point 20 responds by processing the information in computer 22 in accordance with service logic 24 and returns control orders to the service switching point computer 30 which translates those orders into appropriate switching (32) and traffic processing and call control processing (36) for controlling digital switching.

More specifically, the service switching point 28 detects triggering conditions, i.e., identifies network signals related to services and the handling of these signals; transfers calls to the service control processor; receives responses from the service control processor; checks at the request of the service control processor whether specific conditions arise, and if so, transmits corresponding messages to the service control processor; orders setup and release of connections in the transport network; and interacts with intelligent peripheral (IP) equipment. The intelligent peripheral 34 may used for example in the present invention to provide different voice synthesis announcements to subscribers and receive/decode digits from dual-tone multi-frequency (DTMF) telephones. In addition, the intelligent peripheral 34 may also receive voice inputs (rather than only DTMF tones) and employ suitable voice recognition software to decode subscriber responses. While the intelligent peripheral 34 may be included in the service switching point 28, it may also be provided as a separate node accessible by the service switching point 28 via its switching function 32.

In operation, a subscriber places a call from one of the telecommunications devices 14a–14e. The signaling and information (including voice tones and/or data) from some of the devices may optionally be interfaced to the communications network 12 through an appropriate local exchange 16a–16d. Alternatively, the subscriber may be directly connected to the service switching point 28. Service switching point 28 monitors the call request on the network and detects a prepayment network service trigger condition, e.g., the dialed special prepay network services number, and establishes the necessary signaling path to communicate this request along with other information about the subscriber and the specific request to the service control point computer 22.

In response to the prepayment network service request, the service point computer 22, using service logic 24, processes the request, accesses the necessary record from database 26 using service logic 24, checks that record as appropriate, and sends various orders including voice prompts, voice communications, authorizations, security messages, etc. for implementation by the service switching processor all in accordance with the service logic 24. The service switching computer 30 implements the requested orders from the service control point 20 using an appropriate function such as the traffic processing and call control function 36 or requests that the function be implemented using for example the intelligent peripheral 34.

Once the requested prepaid call service is authorized, the service is provided. For example, if the request is to make a normal call connection across the network 12 using a prepay telecommunications device 14a, 14b, 14c, or 14e to connect to the telecommunications device 14f, the switch service point 28 initiates setting up the call connection via its switching function 32 and corresponding local exchange 16e. After the call is terminated, the SCP computer 22 modifies the database 26 reducing the prepaid monetary value by an appropriate amount corresponding to the service rendered.

Another prepay communications service relates to a subscriber automatically adding monetary value to his prepay account using, for example, his residence telephone 14d or personal computer 14e linked for example to the communications network via the internet 11. Of course, call connections may be set up through other nodes, exchanges, and networks in addition to the communications network 12 including for example the packet-switched data network, radio telephone networks, etc. In addition, billing information generated as a result of the prepayment network service is provided to a billing system 40 which includes its own computer 42 and database 44. Billing system database 44 contains records for subscribers to the network.

FIG. 2 illustrates a representative database record 50 stored in service control point database 26 for use in implementing the prepayment network service in accordance with this example embodiment of the present invention. Database record 50 includes a subscriber account number field 52, a prepaid account number field 54, an optional personal identification number (PIN) or other security code field 56, and a current prepayment monetary amount field 58.

The subscriber account number corresponds to the number used to identify a subscriber's basic subscription to the communications network 12. For example, the subscriber account number might correspond to the subscriber's home residence telephone number or business telephone number. This subscriber unique number is used to coordinate prepayment billing with the subscriber's normal monthly telephone bill. Moreover, whenever the subscriber makes a call from his residence or business telephone, the intelligent network nodes 18 immediately know the caller's subscriber account number as the telephone number of the originating telecommunications device. If the caller accesses the network from another telecommunications device and as an extra security/authentication measure, the caller may be prompted to enter his subscriber account number, e.g., the subscriber's residence or business telephone number.

The prepaid account number is a number which specifically identifies the subscriber's subscription to the prepayment network service. Of course, those in the art will appreciate that only one or both of the subscriber and prepay account numbers may be used in database record 50 depending on how the prepayment network service is to be accessed and implemented. Preferably, there is some sort of authentication or other security procedure along with identification of the subscriber and/or prepay account number(s). To this end, requiring the caller to enter an additional security code such as a PIN increases the security and integrity of the prepay network service.

The current prepayment monetary amount is a variable field which is adjusted by service control point 22 either when an authorized, prepay telecommunications service is to be, is currently, or has just been rendered for this subscriber. In addition, the current prepay monetary value amount field may be adjusted in accordance with a subscriber request, e.g., from a telephone or other data communications terminal.

FIG. 3 is an example data billing record created by the service control point 22 and forwarded to the billing system computer 42. The originating telephone number 72 is the telephone number associated with the telecommunications device originating the call. The destination telephone number 74 is the telephone number associated with a recognized destination in the communications network such as the special prepay network service number in intelligent network nodes 18 or another telecommunications device 14f outside of the communications network 12. The subscriber and prepay account numbers are included in one or more fields 76. For calls which are made to other telecommunications devices, start time 78 and lapsed time 80 of the call may be useful information to be included on the billing report. Geographic information such as the call origination location 82, and if relevant, the call destination location 84 may also be included. The other billing information field 86 may be included in the message as needed or otherwise desired. Such a billing record is sent to billing system 40 from the service switching point 28 by way for example of a dedicated link and is then processed by the billing system computer 42. The received billing record is correlated with the subscriber billing information already logged in its database 44 in order to generate an appropriate billing statement to the subscriber to include a description of prepayment network services rendered during that billing cycle and the charges therefor.

Figure 4A:
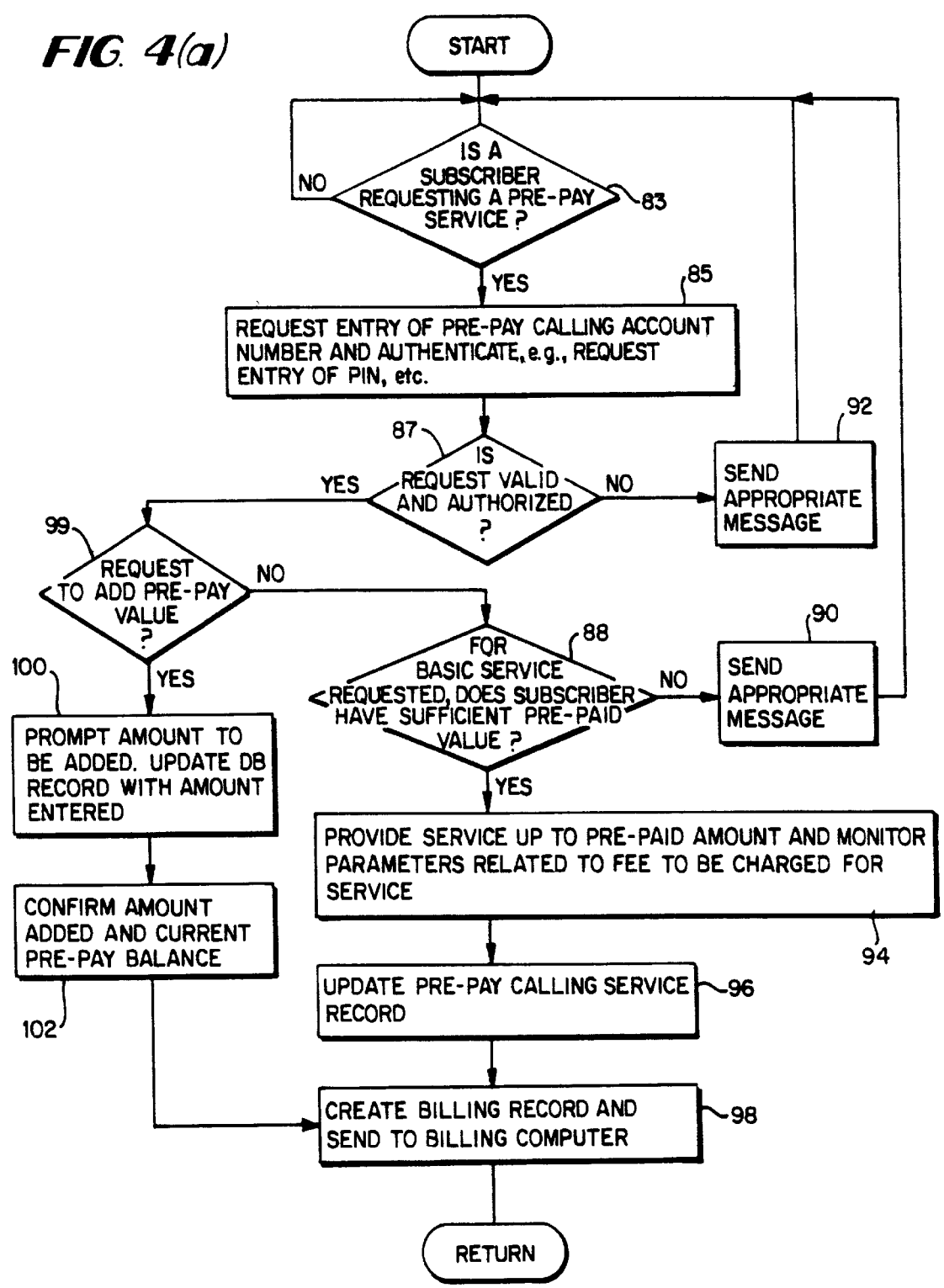
FIGS. 4(a) and 4(b) are flow diagrams illustrating example methods of implementing a prepaid network-based service in accordance with example embodiments of the present invention.
Figure 4B:
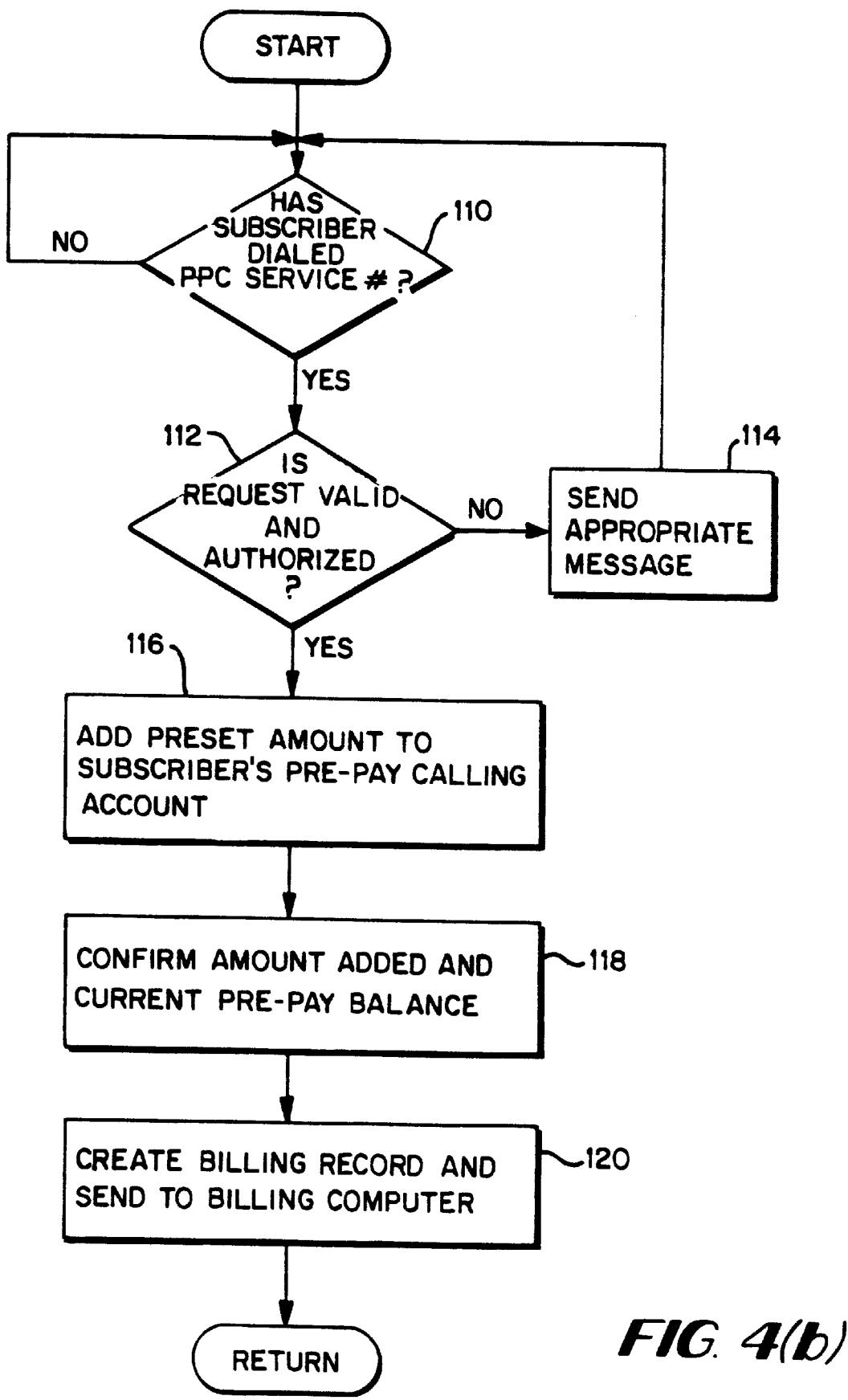

Example methods for providing a communications network-based, prepaid telecommunications service are now described in conjunction with the flowcharts shown in FIGS. 4(a) and 4(b). It is to be understood that while the method may be used by the specific apparatus in the illustrative example embodiment shown in FIG. 1, the method is not limited to that specific implementation.

Initially, a decision is made at the network whether a subscriber is requesting a prepaid telecommunications service (block 83). One example way in which such a service might be requested would be the dialing of a prepay network service telephone number. Another example might be for a caller to simply request a prepayment service from a prepayment telecommunications device which prompts the caller to input payment. In response to the prompt, the caller enters an appropriate account number (either a subscriber account number or prepay account number) which is detected by the network. If a prepay network service is requested, the network requests entry of a prepay calling account number or receives some other input which permits identification of the appropriate account number and authenticates or otherwise authorizes the request (block 85). For example, the network may require the caller to enter a security code or personal identification number (PIN) in order to make sure the service request is legitimate and authorized. In one particular instance, if the caller is calling from the subscriber telecommunications device (e.g., a residence or business telephone), the network is already aware of the subscriber account number. If the request is somehow invalid or not authorized as determined in block 87, the network sends an appropriate message (block 92) back to the caller.

Assuming that the prepay network service request is valid and authorized, the subscriber's database record is checked to determine whether there is sufficient prepaid value in subscriber's database record to pay for the requested telecommunications service. If not, an appropriate message is sent to the caller (block 90). If there is sufficient prepaid value in the subscriber database record, the network authorizes the requested telecommunications service up to the prepaid amount currently stored in the subscriber database record (block 94). The network appropriately monitors parameters related to any fee to be charged for the service such as start time, elapsed time, origination location, destination location, rate information, etc. Preferably this monitoring service is conducted in real time so that the network immediately detects when the caller has consumed or nearly consumed the existing monetary value stored in the subscriber's database record. Once that point has been reached, the network may then warn the caller of the nearing expiration of value/service and encourage the addition of new value to the subscriber database record either immediately or at some later time.

The network then updates the subscriber's prepaid calling service record by debiting the prepaid amount stored in the record by the fee associated with the telephone communications service to be or having been rendered. An appropriate billing record such as that shown in FIG. 3 is generated and forwarded to the billing computer (step 98) and correlated in the billing system subscriber database for use in generating the subscriber's monthly bill.

Returning to decision block 99, if the prepay network communications service request is to add to the subscriber's existing prepayment amount in a subscriber's database record, the network prompts the subscriber for the monetary amount to be added (block 100). Such a prompt could be a for example synthesized voice prompt. The subscriber then inputs a desired amount either by depressing corresponding keys on the telecommunications device or by a voice input that is detected and decoded by appropriate voice recognition software in the network. The subscriber's database record is then updated by adding the input amount to generate a new prepaid monetary amount. The network confirms that amount using for example a synthetic voice message as well as informs the subscriber of the current prepaid balance (block 102). An appropriate billing record or other similar message is generated by the network to include the newly added prepay value to the subscriber's regular telephone bill under a line item such as "Prepay Services" (block 98).

FIG. 4(*b*) shows a flowchart of a more streamlined approach to adding pre-pay value to a subscriber account when a call is placed from the subscriber's residence or business telephone or other device associated with the subscriber's account number. Initially, a decision is made whether the subscriber has dialed the pre-pay calling service number, e.g., an "800" number for accessing the pre-pay calling service (block 110). The call from the subscriber's residence or business telephone to the pre-pay calling service number is interpreted as a request to add monetary value to that subscriber's pre-pay account. The request is checked for validity and authorization (block 112). If the request is invalid or not authorized as determined in block 87, the network sends an appropriate message (block 114) back to the caller. Assuming that the prepay network service request is valid and authorized, a preset amount of money, e.g., $10, is automatically added to the subscriber's account in the database (block 116). The amount automatically added to the subscriber's pre-pay account is confirmed to the caller, e.g., via voice synthesized message, along with the subscriber's current pre-pay account balance (block 118). An appropriate billing record such as that shown in FIG. 3 is generated and forwarded to the billing computer (block 120) and correlated in the billing system subscriber database for use in generating the subscriber's monthly bill.

Figure 5:
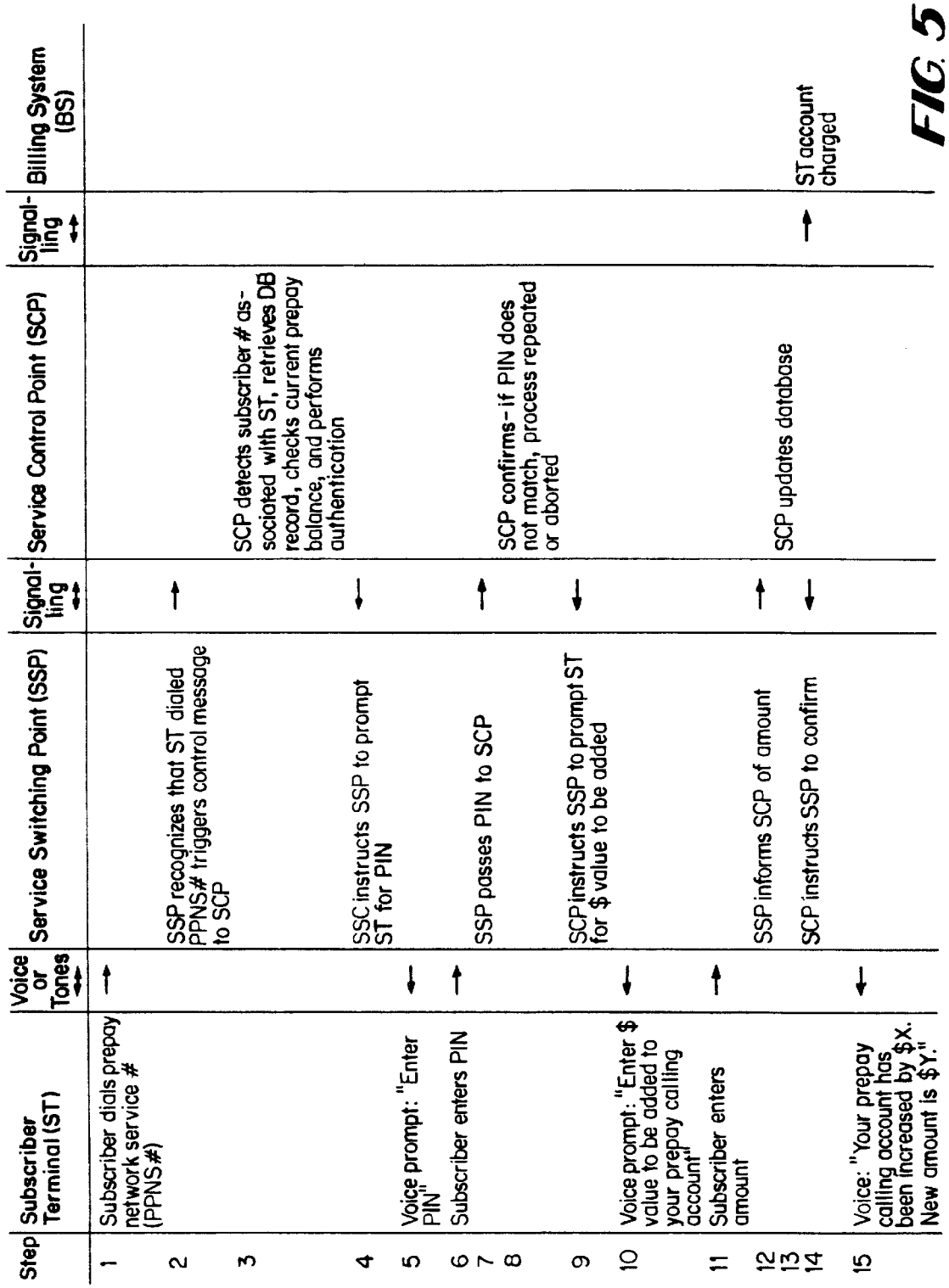
FIG. 5 is a flow diagram of example functions performed by different elements of the example embodiment of FIG. 1.

An illustrating of how a subscriber increases his prepaid account balance using the example intelligent network node implementation in FIG. 1 is now described in conjunction with FIG. 5. In step 1, the subscriber dials from a subscriber terminal a prepay network service number. The local exchange routes the call to the service switching point 28 which registers this as an intelligent network call by detecting these dialed digits. The triggering function 31 is also used to collect necessary call data which is then forwarded to the service control point 20 as indicated in step 2. The service logic 24 in service control point 20 is used by computer 22 to analyze the information from the service switching point 28 in step 3.

More particularly, the service control processor detects the subscriber account number associated with this subscriber terminal, retrieves the subscriber's database record from database 26, checks the current prepaid balance in the database record, and preferably performs some type of authentication. In this example, the service control processor 20 sends a message to the service switching point 28 instructing it to prompt the subscriber terminal for entry of a security code such as a PIN (step 4). The switching service intelligent peripheral 34 transmits via switching function 32 a corresponding synthesized voice prompt such as "ENTER PIN" in step 5. The subscriber then enters his PIN number (step 6) which is passed via switching function 32 to the intelligent peripheral 34 which transforms the tones into data (step 7). This data is then forwarded to the service control point 20. The service point 28 checks the entered PIN number, and if it does not match the PIN stored in the subscriber database record, either requests re-entry of the PIN or aborts the transaction (step 8).

Assuming that the subscriber properly enters his PIN code, the service control point 20 instructs the service switching point 28 to prompt the subscriber telecommunications device 14*d* for a monetary value to be added to his prepaid account. Again, the intelligent peripheral 34 generates a voice prompt communicated to the subscriber terminal via switch function 32 such as "ENTER DOLLAR VALUE TO BE ADDED TO YOUR PREPAID CALLING ACCOUNT." Then in step 11, the subscriber enters the dollar amount (e.g., using numbers entered by DTMF keypad), which is detected by the intelligent peripheral 34 via switching function 32, converts the DTMF tones into appropriate digital format, and forwards the amount to the service control point 20.

The service control point 20 updates the subscriber record stored in database 26 (step 13). The service control point 20 then signals the billing system to update the subscriber's account in the billing system database 44 to reflect the amount added by the subscriber during this transaction and any associated service (step 14). The service switching point 28 is also instructed to confirm the transaction with the subscriber terminal. In response, the intelligent peripheral 34 generates a voice message routed to the subscriber terminal via switching function 32 to the effect "YOUR PREPAID CALLING ACCOUNT HAS BEEN INCREASED BY (the amount the subscriber entered). YOUR NEW PREPAID ACCOUNT BALANCE IS (the total amount)" (step 15).

As described earlier, the present invention provides a number of advantages to the subscriber. Significantly, the subscriber does not need to continually purchase prepaid calling cards. This task is quite time consuming in that the subscriber must travel to a telecommunications sales outlet or other distributor. Instead, prepay services are only a telephone call away. For the operator, the invention not only reduces costs in terms of the overhead associated with generating and administering this card creation and distribution, but also reduces costs associated with the manufacture, installation, and maintenance of card readers at prepaid telecommunications devices. In addition, by providing an extremely convenient way for a subscriber to add money to his prepaid services account ultimately results in higher network usage and therefore more network operator revenue.

Although the invention is described in FIGS. 1 and 5 in the context of intelligent network nodes, the present invention may be implemented using any other type of node coupled to the network. Such a node need only contain a computer, a database, and some mechanism to interface with the network. Therefore, while the invention has been described in connection with what is presently considered to be practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. In a telecommunications network, a method for facilitating prepayment for communication services, comprising the steps of:

providing a subscriber with an automated, prepayment telecommunications network service with a prepaid account number having associated therewith a prepaid monetary value;

the subscriber contacting a prepayment telecommunications network service number from a communications terminal with a request that a monetary value be added to the prepaid account number; and the prepayment telecommunications network service adding the monetary value to the prepaid monetary value associated with the prepaid account number and providing charges corresponding to the added monetary value to a billing system so those charges are included in a telecommunications bill to the subscriber, wherein the subscriber may thereafter use the added monetary value to pay for a subsequent communications service.

2. The method in claim 1, the automated, prepayment telecommunication service is implemented as an intelligent network service.

3. The method in claim 1, wherein the monetary value is a fixed amount.

4. The method in claim 1, wherein the monetary value is defined by the subscriber.

5. The method in claim 1, wherein the monetary value is added to the prepaid monetary value associated with the prepaid account number when the subscriber makes the contact.

6. The method in claim 1, wherein the monetary value is transferred from an account other than an account associated with the prepaid account number.

7. The method in claim 1, wherein the contact is made by way of the Internet and the prepayment telecommunications network service number includes an Internet address.

8. The method in claim 1, wherein the contact is made using a voice call, the prepayment telecommunication service using an interactive voice response unit when voice call contact is made.

9. The method in claim 1, wherein the contact is made using a mobile radio.

10. The method in claim 1, wherein the contact is made using a messaging service.

11. The method in claim 1, further comprising:
the billing system including in a next telephone bill to the subscriber charges corresponding to the added monetary value.

12. A method of operating a communications network where communication services provided by the system may be paid for in advance using an automated prepayment service, comprising:
creating a record in a database assigned to a network subscriber, the database record including a prepaid account number, a subscriber number, and an associated prepaid monetary value;
the subscriber contacting the automated prepayment service to add monetary value to the subscriber's prepaid account;
in response to the subscriber contact, adding monetary value to the subscriber's prepaid account in the database and communicating the amount of money added to the subscriber's prepaid account to a billing controller to add the amount of money to a telephone bill issued to the subscriber.

13. The method in claim 12, wherein a preset amount of monetary value is automatically added to the subscriber's prepaid account record in response to the subsequent subscriber contact.

14. The method in claim 12, wherein a subscriber-defined amount of monetary value is added to the subscriber's prepaid account record in conjunction with the subsequent subscriber contact.

15. The method in claim 12, wherein the monetary value is a fixed amount.

16. The method in claim 12, wherein the monetary value is added to the subscriber's prepaid account record when the subscriber makes the contact.

17. The method in claim 12, wherein the contact is made using the Internet the automated prepayment service is associated with an Internet address and the automated prepayment service is associated with an Internet address.

18. The method in claim 12, wherein the contact is made using a voice call, the prepayment service using an interactive voice response unit when voice call contact is made.

19. The method in claim 12, wherein the contact is made using a mobile radio.

20. The method in claim 12, wherein the contact is made using a messaging service.

21. The method in claim 12, further comprising:
the subscriber initiating a communication service from a telecommunications device and indicating that the communication service will be paid for using the prepaid account;
the prepayment service prompting input of a prepaid account number;
the subscriber inputting the prepaid account number; and
the subscriber authorizing the communications service if the monetary value associated with the input prepaid account number stored in the database is sufficient to cover at least part of the communications service.

22. The method in claim 12, further comprising:
the prepayment service providing the monetary value added to the subscriber's prepaid account in the database to a telephone billing system, and
the telephone billing system generating a billing record for the subscriber which includes the amount of monetary value added to the subscriber's prepaid account.

23. The method in claim 12, wherein the prepayment service is implemented using an intelligent network.

24. The method in claim 12, wherein the database record includes a security number, the method further comprising:
prompting entry of the security number after confirming the subscriber number;
checking an entered security number; and
if the entered security number is valid, proceeding with adding the monetary value to the subscriber's prepaid account in the database.

25. The method in claim 12, wherein the monetary value is added by transferring the monetary value from an account other than the subscriber's prepaid account.

26. In a communications system including a plurality of communication terminals having access to a communications network, apparatus for providing a prepayment telecommunications service, comprising:
a service controller configured to store records in a subscriber database, each database subscriber record including a prepaid account number field and an associated prepaid monetary value field, and
a service detector, coupled to the service controller, configured to detect a contact relating to prepayment of communications services involving a subscriber;
wherein in response to a detected contact, the service controller is configured to add a monetary value to the prepaid monetary value field associated with the subscriber and to communicate the prepaid monetary value to a billing processor so that the amount of money may be added to a telecommunications bill associated with the subscriber.

27. The apparatus in claim 26, wherein a subsequent prepayment communication service may be requested and rendered using the prepaid monetary value.

28. The apparatus in claim 26, further comprising:
an intelligent peripheral configured to generate synthesized electronic voice messages transmitted through the communications network to facilitate communication with the subscriber.

29. The apparatus in claim 26, further comprising:
an intelligent peripheral configured to detects DTMF tone or voice recognition responses entered from a subscriber communications device corresponding to an amount of monetary value to be added and to convey that amount to the service controller.

30. The apparatus in claim 26, wherein the contact is made via the Internet wherein the service contact is associated with an Internet address and the service contact is associated with an Internet address.

31. The apparatus in claim 26, wherein the contact is made using a messaging service.

32. The apparatus in claim 26, wherein the monetary value is a fixed amount.

33. The apparatus in claim 26, wherein the monetary value is added to the prepaid monetary value field when the subscriber makes the contact.

34. The apparatus in claim 26, wherein the monetary value is defined by the subscriber.

35. The apparatus in claim 26, wherein the service controller is configured to transfer the monetary value from an account other than an account associated with the prepaid account number.

36. The apparatus in claim 26, wherein before adding to the prepaid monetary value field, the service controller is configured to authorize a subscriber number associated with the contact including:

causing a request to be generated prompting entry of an authentication number, and checking an entered authentication number, wherein if the entered authentication number is valid, the service controller adds the monetary value.

37. In a communications system including a plurality of communication terminals having access to a communications network, an Intelligent Network (IN) apparatus providing a prepayment telecommunications service comprising:

a service switching point means, coupled to the service control point means, for detecting calls directed to prepayment of communications services involving IN subscribers, and a service control point means, coupled to the service switching point means, for storing records in a database assigned to IN subscribers, each database record including a prepaid account number and an associated prepaid monetary value for each IN subscriber, and when the service switching point means detects a call to a prepayment telecommunications service number, for identifying the prepaid account number associated with the call, for adding an amount of money to the prepaid monetary value in the database record associated with the prepaid account number, and for communicating the amount of money added to the prepaid monetary value to a billing processor to add the amount of money to a telephone bill issued to the subscriber.

38. The IN apparatus in claim 37, wherein the amount of money is a fixed amount.

39. The IN apparatus in claim 37, wherein the amount of money is defined by the IN subscriber.

40. The IN apparatus in claim 37, wherein the amount of money is added to the prepaid monetary value associated with the prepaid account number when the call is made.

41. The IN apparatus in claim 37, wherein the service control point means transfers the amount of money from an account other than an account associated with the prepaid account number.

42. The IN apparatus in claim 37, wherein the call is made by way of the Internet and the service control point means is associated with an Internet address and the service control point means is associated with an Internet address.

43. The IN apparatus in claim 37, further comprising:

an interactive voice response means for interacting with the subscriber when the call is made.

44. The IN apparatus in claim 37, wherein the call is made using a messaging service.

* * * * *